United States Patent
Ogasawara et al.

(10) Patent No.: US 6,948,015 B2
(45) Date of Patent: Sep. 20, 2005

(54) STORAGE CONTROL DEVICE (75) Inventors: Hiroshi Ogasawara, Odawara (JP);
Shizuo Yokohata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 10/423,045

(22) Filed: Apr. 23, 2003

(65) Prior Publication Data
US 2003/0233498 A1 Dec. 18, 2003

(30) Foreign Application Priority Data
Apr. 23, 2002 (JP) ........................................ 2002-120975

(51) Int. Cl.$^7$ ............................................. G06F 13/12
(52) U.S. Cl. ............................. 710/74; 711/6; 711/100
(58) Field of Search ........................ 710/74, 36; 711/5, 711/6, 100, 101, 102, 114, 111, 112

(56) References Cited

U.S. PATENT DOCUMENTS

| | | | |
|---|---|---|---|
| 6,216,202 B1 | 4/2001 | D'Errico | |
| 6,408,359 B1 | 6/2002 | Ito et al. | |
| 6,499,075 B2 * | 12/2002 | Oeda et al. | ................ 710/104 |
| 6,502,162 B2 * | 12/2002 | Blumenau et al. | .............. 711/5 |
| 6,633,962 B1 * | 10/2003 | Burton et al. | ................ 711/163 |
| 2002/0095549 A1 | 7/2002 | Matsunami et al. | |
| 2003/0093619 A1 | 5/2003 | Sugino et al. | |
| 2003/0182502 A1 | 9/2003 | Kleiman et al. | |

\* cited by examiner

Primary Examiner—Jeffrey Gaffin
Assistant Examiner—Harold Kim
(74) Attorney, Agent, or Firm—Townsend and Townsend and Crew LLP (57) ABSTRACT

A storage control device connected to an external apparatus for exchanging data, comprising: a plurality of logical devices, each of which is associated with one of identifiers, the number of which does not exceed a predetermined number; and input/output means for receiving a data input/output request with one of the identifiers from the external apparatus and for inputting/outputting data to/from the logical device that corresponds to the identifier may be configured such that the storage control device forms a plurality of identifier groups, each of which includes the predetermined number or less of said identifiers and is given one of first IDs; receives a data input/output request with one of said identifiers as well as one of the first IDs from the external apparatus; and inputs/outputs data to/from the logical device that corresponds to the identifier and is included in the identifier group that corresponds to the first ID.

17 Claims, 4 Drawing Sheets

STORAGE CONTROL DEVICE

CROSS REFERENCE TO RELATED APPLICATION

The present application claims priority upon Japanese Patent Application No. 2002-120975 filed on Apr. 23, 2002, which is incorporated herein by reference.

BACKGROUND OF THE INVENTION

1. Field of the Invention

The present invention relates to a storage control device.

2. Description of Related Art

As one of storage control device installed at a data center or the like, a NAS (Network Attached Storage) draws attention, which is connected to the same LAN (Local Area Network) as a host computer and has a function for accepting a data input/output request specifying a file from the host computer.

The storage control device operated by using a NAS technique comprises a NAS engine and a disk controller. The NAS engine carries out input/output of a file from/to an external apparatus and control input/output to/from the disk controller. The disk controller directly inputs/outputs data from/to a physical storage unit such as a disk drive. If the storage unit is operated by a RAID (Redundant Array Independent Disks) technique, the disk controller is also referred to as a RAID controller.

SUMMARY OF THE INVENTION

In order to operate such a storage control device efficiently, it is necessary to efficiently connect between the NAS engine and the RAID controller or sufficiently utilize the performance of a SCSI or SCSI-based interface connecting between the RAID controller and the RAID.

The present invention was made from such a point of view and endeavors to provide a storage control device that functions effectively and efficiently.

In order to achieve the object of the present invention, in accordance with an aspect of the present invention, in a storage control device, comprising: a plurality of logical devices, each of which is associated with one of identifiers, the number of which does not exceed a predetermined number; and input/output means for receiving a data input/output request with one of the identifiers from the external apparatus and for inputting/outputting data from/to the logical device that corresponds to the identifier, the storage control device forms a plurality of identifier groups, each of which includes the predetermined number or less of said identifiers and is given one of first IDs; receives a data input/output request with one of said identifiers as well as one of the first IDs from the external apparatus; and inputs/outputs data from/to the logical device that corresponds to the identifier and is included in the identifier group that corresponds to the first ID.

In accordance with the present invention, it is thus possible to provide a storage control device that functions effectively and efficiently.

BRIEF DESCRIPTION OF THE DRAWINGS

In order to help the reader understand the present invention and its merits more completely, the present invention is explained by referring to accompanying diagrams wherein.

DETAILED DESCRIPTION OF THE INVENTION

Outline of the Disclosure

At least, the following facts become clear from description of this specification with reference to the diagrams.

A storage control device, according to the present invention, connected to an external apparatus for exchanging data between them, comprising: a plurality of logical devices, each of which is associated with one of identifiers, the number of which does not exceed a predetermined number; and input/output means for receiving a data input/output request with one of the identifiers from the external apparatus and for inputting/outputting data from/to the logical device that corresponds to the identifier may be configured such that the storage control device forms a plurality of identifier groups, each of which includes the predetermined number or less of said identifiers and is given one of first IDs; receives a data input/output request with one of said identifiers as well as one of the first IDs from the external apparatus; and inputs/outputs data from/to the logical device that corresponds to the identifier and is included in the identifier group that corresponds to the first ID.

Conventionally, in accordance with the SCSI specifications, for example, up to 8 IDs (that is, identifiers cited above) are prescribed. Thus, up to 8 logical devices can be connected in a logical-device group. If some of the IDs are utilized for system use, the number of IDs available for use by the user inevitably decreases by the number of IDs for system use.

In accordance with the configuration of the present invention, however, even if some of the IDs are utilized for system use, the user is allowed to use logical-device groups other than the group including logical devices for system use up to the predetermined number of logical devices.

Alternatively, a storage control device connected to an external apparatus for exchanging data therebetween, comprising: a plurality of logical devices; and input/output means for inputting/outputting data from/to at least one of the logical devices may be configured such that the input/output means is provided with a plurality of queues, each of which is identified by one of second IDs, and the storage control device receives an input/output request with one of the second IDs from the external apparatus, stores the input/output request in the queue that corresponds to the second ID, and implements the input/output request on the basis of priority assigned to each of the queues.

Thus, it is possible to control priority for input/output requests more finely and utilize the logical devices more effectively.

Furthermore, a storage control device connected to an external apparatus for exchanging data between them, comprising: a plurality of logical devices, each of which is associated with one of identifiers, the number of which does not exceed a predetermined number; and input/output means for receiving a data input/output request with one of the identifiers from said external apparatus and for inputting/outputting data from/to the logical device that corresponds to the identifier may be configured such that said storage control device forms a plurality of identifier groups, each of which includes the predetermined number of identifiers and is given one of third IDs; said input/output means is provided with a plurality of queues, each of which is associated with one of the third IDs; a data input/output request with one of the third IDs as well as one of the identifiers is received from the external apparatus and stored in the queue that corresponds to the third ID; and the data input/output request is implemented on the basis of priority assigned to each of said queues.

Thus, it becomes possible to control priority for input requests more finely and utilize the logical devices more effectively.

In addition, the storage control device may be configured such that a data communication between the logical devices and control means including a command is carried out by passing data based on a CDB (Command Descriptor Block) prescribed in SCSI specifications. This improves the feeling to use the storage control device and the generality of the storage control device.

Furthermore, the storage control device may be configured such that the input/output means has sending/receiving means for sending/receiving data to/from the external apparatus in the form of a file and has execution means for inputting/outputting data from/to at least one of the logical devices; and the sending/receiving means makes the execution means implement an data input/output request from/to the logical device, which has been received from the external apparatus.

Thus, the sending/receiving means for sending/receiving data to/from the external apparatus is separated from the execution means for inputting/outputting data from/to the logical devices to increase the efficiency of the operations to input/output data from/to the logical devices.

Moreover, the storage control device may be configured such that the sending/receiving means categorizes the input/output request and stores the input/output request in one of the queues; and the execution means assigns priority to each of the queues and inputs/outputs data according to the priority.

Thus, the means for classifying received input/output requests for each of the queues is separated from the means for executing the input/output request to increase the efficiency of the operations of inputting/outputting data from/to the logical devices.

Alternatively, a storage control device connected to an external apparatus for exchanging data between them, comprising: a plurality of logical devices; execution means for inputting/outputting data to/from at least one of the logical devices; and sending/receiving means for sending/receiving data to/from said external apparatus in the form of a file and for making the execution means implement an data input/output request to/from at least one of the logical devices, which has been received from the external apparatus may be configured such that the execution means and the sending/receiving means monitor each other for one means to detect failure that has occurred in another means.

Thus, each of the execution means and the sending/receiving means becomes capable of detecting a failure occurring in the other means.

Furthermore, a storage control device connected to an external apparatus for exchanging data between them, comprising: a plurality of logical devices; a plurality of execution means for inputting/outputting data to/from at least one of the logical devices; and sending/receiving means for sending/receiving data to/from the external apparatus in form of a file and for making the execution means implement an data input/output request to/from at least one of the logical devices, which has been received from the external apparatus may be configured such that the sending/receiving means selects specific execution means among the execution means and makes the selected execution means input/output data to/from the logical device.

Consequently it becomes possible to disperse the load of the execution means.

Moreover, the storage control device may be configured such that the execution means and the sending/receiving means monitor each other for one means to detect a failure that has occurred in the other means.

Thus, each of the execution means and the sending/receiving means becomes capable of detecting a failure in the other means.

In addition, the storage control device may be configured such that if one of the execution means has a failure and the sending/receiving means receives an input/output request specifying the failed execution means, the sending/receiving means makes another execution means implement the input/output request.

Thus, processing can be continued by quickly avoiding the execution means in which the failure has occurred.

Furthermore, the storage control device may be configured such that the execution means and the sending/receiving means monitor each other by sending a signal periodically and, if one means does not receive the signal from the other means for a predetermined period of time, it is judged that the other means has failure.

Thus, if the execution means or the sending/receiving means has not received an exchanged signal from the other means for a predetermined period of time, a failure is quickly recognized by the means that has not received the signal. Moreover, by providing each of the execution means and the sending/receiving means with a self-recovery means for recovering from a failure for itself, each of them becomes capable of recovering from a failure for itself by using a signal received from the other means as a trigger.

In addition, the storage control device may be configured such that one of the execution means and the sending/receiving means sends a failure-repairing signal for repairing a failure to the other means in judging that the other means has failure. Thus, each of the execution means and the sending/receiving means is capable of repairing the other means from a failure.

Furthermore, the storage control device may be configured such that a circuit implementing the sending/receiving means and a circuit implementing the execution means are provided on the same substrate.

Thus, the execution means and the sending/receiving means are connected more tightly to increase speed and efficiency of data input/output.

Moreover, the storage control device may be configured such that the logical devices are operated by adoption of the RAID technique.

As a result, the operation of the storage apparatus can be carried out more efficiently.

DETAILED DESCRIPTION OF THE PREFERRED EMBODIMENTS

First Embodiment

Figure 1:
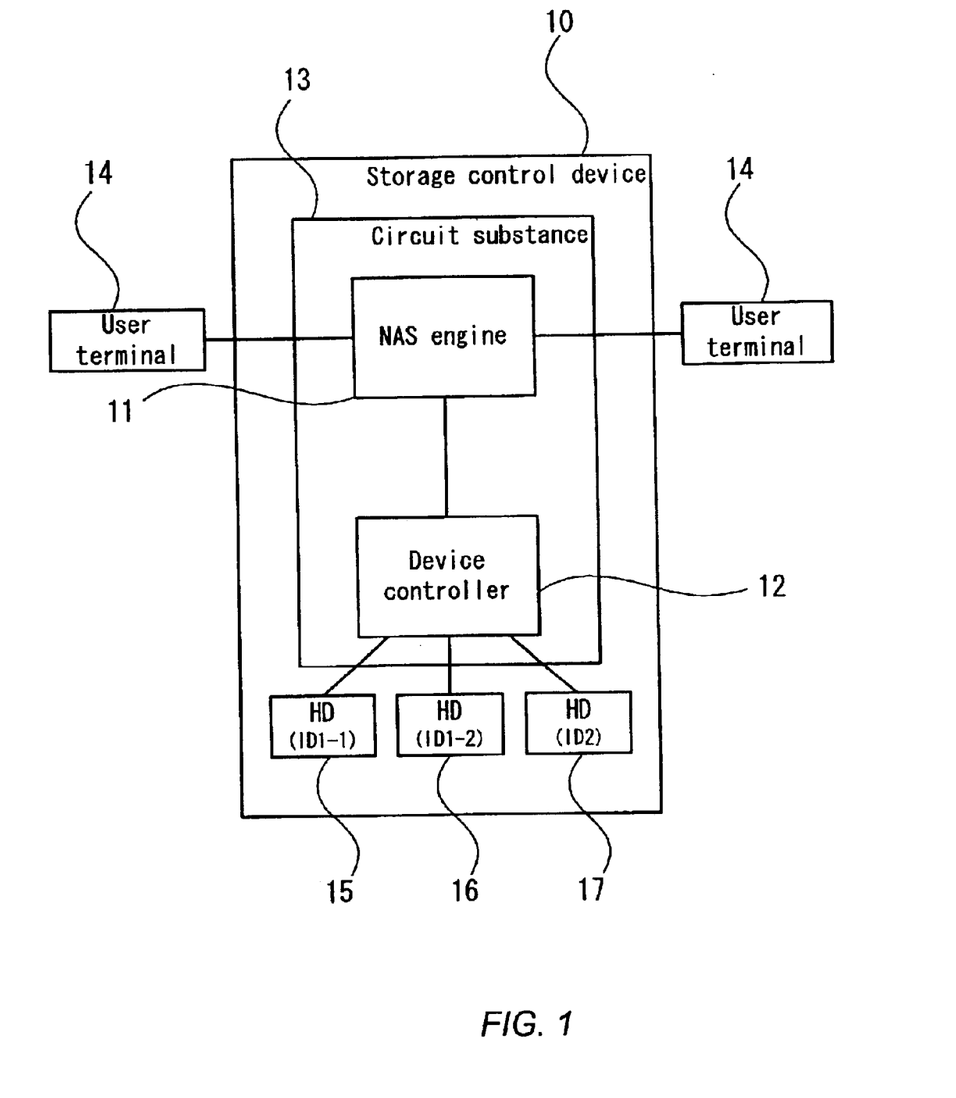
FIG. 1 is a diagram showing an overall configuration of a storage control device implemented by an embodiment of the present invention.

FIG. 1 is a diagram showing an overall configuration of a storage control device implemented by a first embodiment of the present invention.

A storage control device 10 comprises a NAS engine 11 as a means for sending/receiving data and a device controller 12 as an execution means, which are provided on a single circuit substrate 13. The storage control device 10 also comprises hard disks 15, 16 and 17. Each of the hard disks 15, 16 and 17, referred to hereafter simply as HD, is a storage device.

The NAS engine 11 is connected to an external user terminal 14 or a client typically by a LAN. The device controller 12 is connected to the HDs 15 identified by a group ID 1—1, the HDs 16 identified by a group ID 1-2 and the HDs 17 identified by a group ID 2 through a SCSI interface or an interface using SCSI-based CDB. The group IDs 1—1, 1-2 and 2 are each a first ID. The device controller 12 has a function to execute input/output processing to/from the HDs. Thus, in accordance with the SCSI specifications, the device controller 12 is capable of controlling logical devices, the maximum number of which is prescribed to be 8 for each group ID.

The HDs 15 identified by the group ID 1—1 and the HDs 16 identified by the group ID 1-2 form a RAID. The HDs identified by the group ID 1—1 and the hard disk 16 identified by the group ID 1-2 each include 8 LUs (Logical Units), each of which is used as a logical device. These logical devices form a user storage area that can be utilized by a user. A user terminal 14 receives/sends data from/to an HD group in the storage control device 10 according to an input/output request with a group ID specifying the HD group. The input/output request is referred to hereafter as a command. A command is, for example, set to the group ID 1—1. In this case, the user terminal 14 receives/sends data from/to the HDs 15 identified by ID 1—1. The user terminal 14, however, is not capable of using the HDs identified by the group ID 1-2 and the group ID 2.

In the HDs 17 identified by the group ID 2, 2 LUs are set to form a system storage area for storing a system of the NAS engine 11, the device controller 12 and the like. In order to distinguish LUs in the HDs identified by a group ID, a logical-unit number abbreviated hereafter to a LUN is assigned to each of the LUs as an identifier. When the user wants to receive/send a file from/to a specific HD, the file is received/sent from/to a directory in an-LU identified by a LUN.

The following description explains processing carried out in the storage control device 10 with the configuration described above to process a command received from the user terminal 14.

First of all, the user terminal 14 sends a command with a group ID, assuming <0> assigned to the group ID of 1—1, and a LUN, assuming <11> assigned to LU 3, to the storage control device 10. When the command is received by the storage control device 10, the NAS engine 11 executes the command to LU3 in the HDs identified by the group ID 1—1, according to the numbers <0> and <11> accompanied with the command. Thus, the user terminal 14 is capable of selecting an LU, with which the data is to be exchanged, among the 8 LUs in the group identified by the group ID.

In this way, the user terminal 14 exchanges data only with a specific group identified by the ID and can use up to a maximum number of LUs in the group in accordance with the specifications.

Second Embodiment

Figure 2:
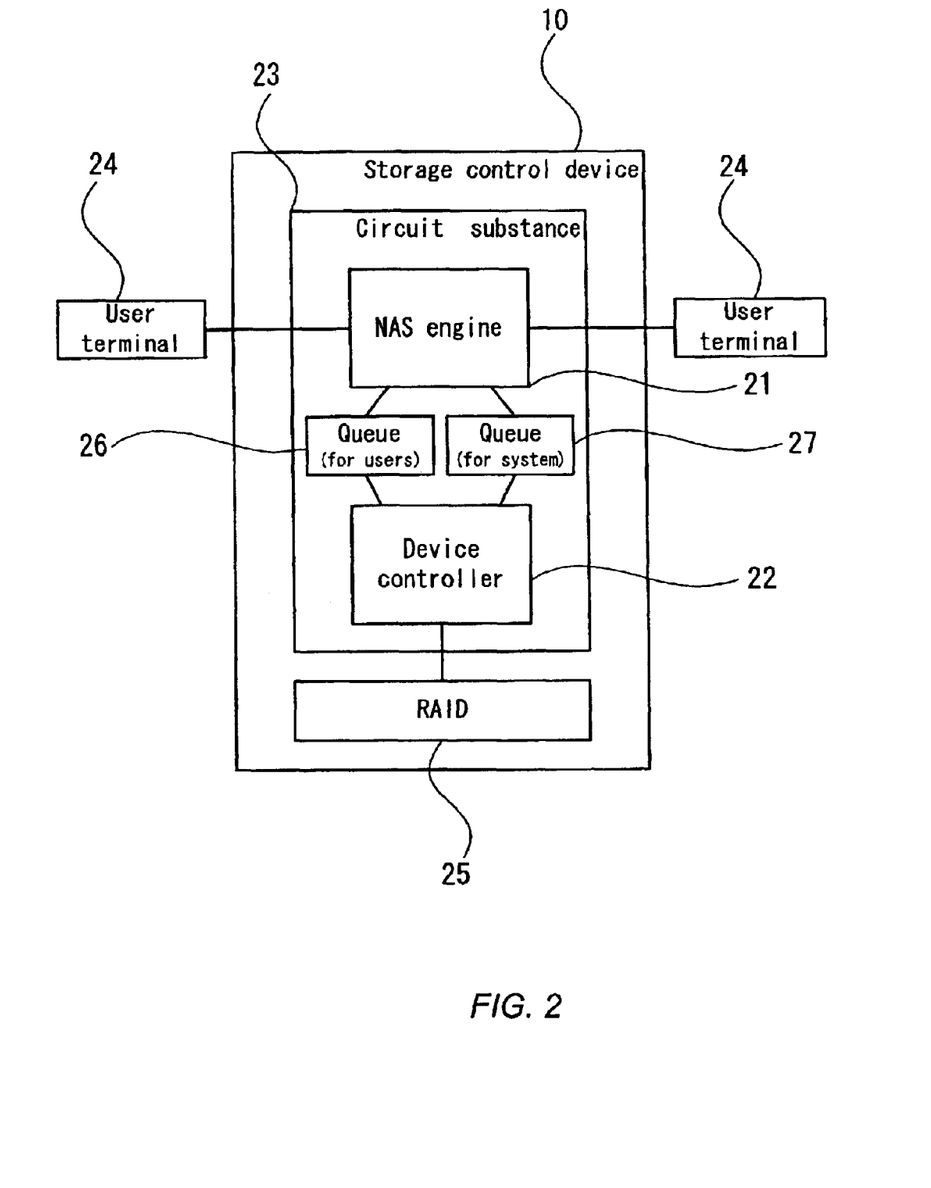
FIG. 2 is a diagram showing an overall configuration of a storage control device implemented by another embodiment of the present invention.

FIG. 2 is a diagram showing an overall configuration of a storage control device 10 implemented by a second embodiment of the present invention.

The storage control device 10 comprises a NAS engine 21 as means for sending/receiving data and a device controller 22 as an execution means, which are provided on a single circuit substrate 23.

The NAS engine 21 is connected to an external user terminal 24 or a client by typically a LAN. The device controller 22 communicates with HDs, which are used as logical devices forming a RAID 25, through an interface using SCSI-based CDB. The circuit substrate 23 includes an area for communications between the NAS engine 21 and the device controller 22. In the area, provided are a user queue 26 and a system queue 27.

A queue tag as a second ID for identifying a source transmitting the data input/output request is attached to a data input/output request, referred to hereafter as a command. For example, <0> is attached to a command sent by the external user terminal 24 and <1> to a command sent by the NAS engine 21.

A command sent from the NAS engine 21 to the device controller 22 is distributed and stored in an appropriate queue 26, 27 by the NAS engine 21 according to the queue tag attached to the command. On the other hand, the device controller 22 has a function to assign priority to each of queues 26, 27, for example to set the priority so that a command stored in the system queue 27 is processed in advance to a command stored in the user queue 26. Thus, when commands are stored in both of the queues, the user queue 26 and the system queue 27, at the same time, the device controller 22 processes commands stored in the system queue 27 first. It is not until the process of all commands stored in the system queue 27 is completed that a command stored in the user queue 26 is processed. Furthermore, it is possible to give a weighted factor to each of the queues, that is, to set a ratio to fetch a command from the user queue 26 and the system queue 27 and process commands in the queues in accordance with the ratio. For example, weighted factors of 9 and 1 are applied to the system queue 27 and the user queue 26 respectively to give a ratio of 9:1. In this case, a command transmitted by the user terminal 24 and stored in the user queue 26, if any, is processed only when there is no command in the system queue 27 as described above. In addition, after 9 commands stored in the system queue 27 have been processed consecutively, a command stored in the user queue 26 is processed by all means even if there is still a command remaining on the system queue 27.

The following description explains processing carried out by the storage control device 10 with the configuration described above to process a command received from the user terminal 24.

First of all, the user terminal 24 sends a command with a group ID such as a queue tag of <0> and a LUN such as an LUN of <11> assigned to LU 3 to the storage control device 10. When the command is received by the storage control device 10, the NAS engine 21 stores the command in the user queue 26 because the command are associated with a queue tag of <0>. On the other hand, the device controller 22 has a function to assign priority to each of the user queue 26 and the system queue 27 so that a command stored on the system queue 27 is processed first. When all commands are processed in the system queue 27 before nine commands in the system queue 27 are processed, the command stored in the user queue 26 is processed to input/output data to/from LU 3 identified by the LUN of <11>. In addition, after 9 commands stored in the system queue 27 have been processed consecutively, a command stored in the user queue 26 is processed to input/output data to/from LU 3 by all means even if a command remains to be executed in the system queue 27. After a command stored in the user queue 26 is processed, commands remaining in the system queue 27 are again processed.

In this way, by providing the queues with priority for a command to be executed, it is possible to assign finer priority to each command.

Third Embodiment

Figure 3:
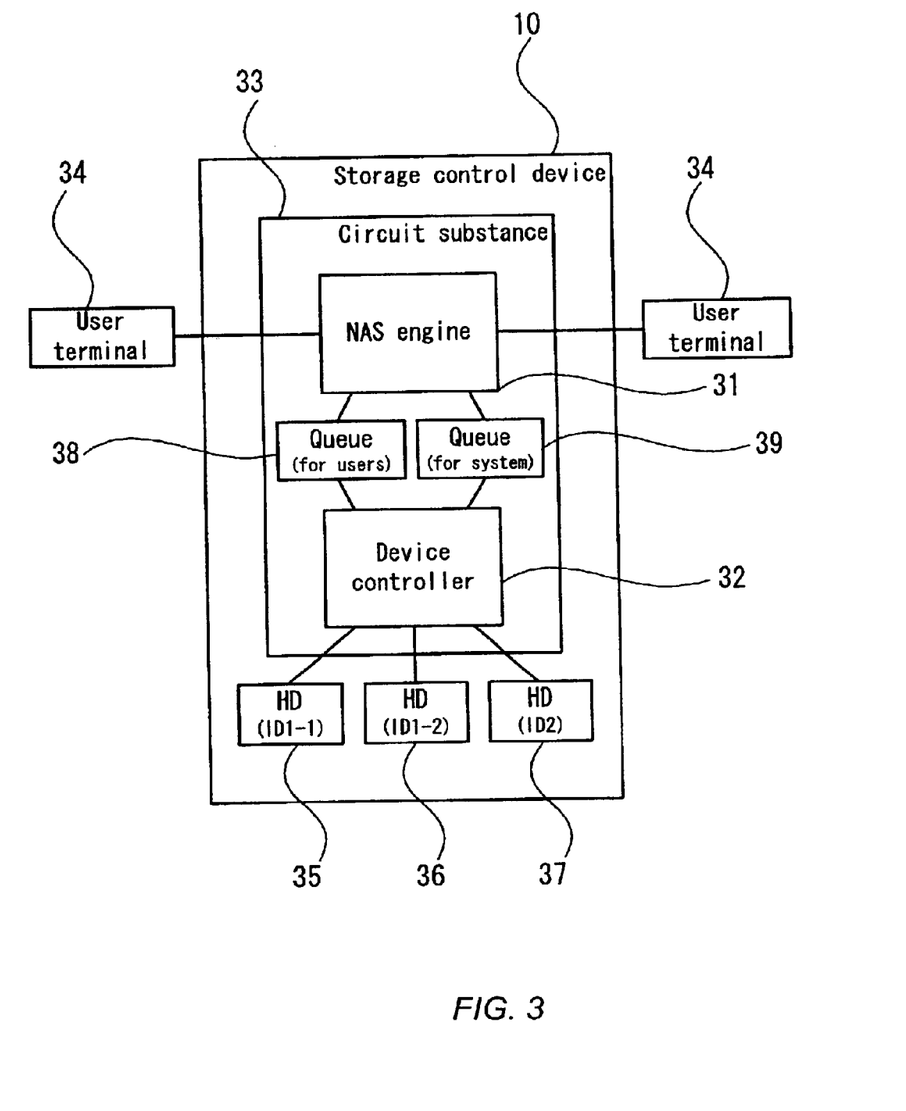
FIG. 3 is a diagram showing an overall configuration of a storage control device implemented by a further embodiment of the present invention.

FIG. 3 is a diagram showing an overall configuration of a storage control device 10 implemented by a third embodiment of the present invention.

The storage control device 10 comprises a NAS engine 31 as a means for transmitting and receiving data and a device controller 32 as an execution means, which are provided on a single circuit substrate 33. The storage control device 10 includes HDs 35, 36 and 37 used as recording devices.

The NAS engine 31 is connected to an external user terminal 34 or a client by typically a LAN. The device controller 32 is connected to HDs 35 identified by a group ID 1—1, HDs 36 identified by a group ID 1-2 and HDs 37 identified by a group ID 2 through an SCSI interface. Each of the group IDs 1—1, 1-2 and 2 is a third ID. The device controller 32 has a function to execute input/output processing. Thus, in accordance with the SCSI specifications, the device controller 32 is capable of controlling logical devices the maximum number of which is prescribed to be 8 for each group ID.

In addition, the circuit substrate 33 includes an area for communications between the NAS engine 31 and the device controller 32 and in this area, provided are a user queue 38 and a system queue 39. The group ID also functions as a queue tag for identifying the source transmitting a command. That is to say, a command is distributed to the user queue 38 or the system queue 39 in accordance with a group ID associated with the command.

The HDs 35 identified by the group ID 1—1 and the HDs 36 identified by the group ID 1-2 form a RAID. Each of the HDs 35 identified by the group ID 1—1 and the HDs 36 identified by the group ID 1-2 includes 8 LUs (Logical Units), each of which is used as a logical device. These logical devices form a user area that can be utilized by the user.

Inputs/outputs from/to the user terminal 34 are associated to HDs 35 identified by the group ID 1—1 and the user terminal 34 is not capable of recognizing the group IDs 1-2 and 2. In HDs 37 identified by the group ID 2, 2 LUs are set to form a system area for storing a system of the NAS engine 31, the device controller 32 and the like. In order to distinguish LUs in a group identified by a group ID, a logical-unit number, abbreviated hereafter to a LUN, is assigned to each of the LUs as an identifier. When the user wants to send/receive a file to/from the HD, the user can communicate with a directory corresponding to a LUN and send/receive the file to/from a specific LU identified by a LUN.

The following description explains an example of processing of a command sent from the user terminal 34 by the storage control device 10 with the configuration described above.

First of all, the user terminal 34 sends a command with a group ID <0> assigned to the group ID of 1—1 and a LUN <11> assigned to LU 3 to the storage control device 10. When the command is received by the storage control device 10, the NAS engine 31 stores the command in the user queue 38 according to a group ID <0>. On the other hand, the device controller 32 has a function to assign priority to each of queues 38, 39, for example to set the priority so that a command stored in the system queue 39 is processed in advance to a command stored in the user queue 38. As the process of all commands stored in the system queue 39 is completed, the command stored in the user queue 38 is processed to input/output data to/from LU 3 in the HDs identified by the group ID 1—1 according to the numbers <0> and <11>. If weighted factors of 9 and 1 are applied to the system queue 39 and the use queue 38, respectively, after 9 commands stored in the system queue 39 have been processed consecutively, a command stored in the user queue 38 is processed to input/output data to/from LU 3, which is identified by the LUN of <11> and included in the HD group 35 identified by the group ID of <0>, by all means even if a command remains to be executed in the system queue 39. After the command stored in the user queue 38 is processed, a command remaining in the system queue 39 is again processed.

Fourth Embodiment

Figure 4:
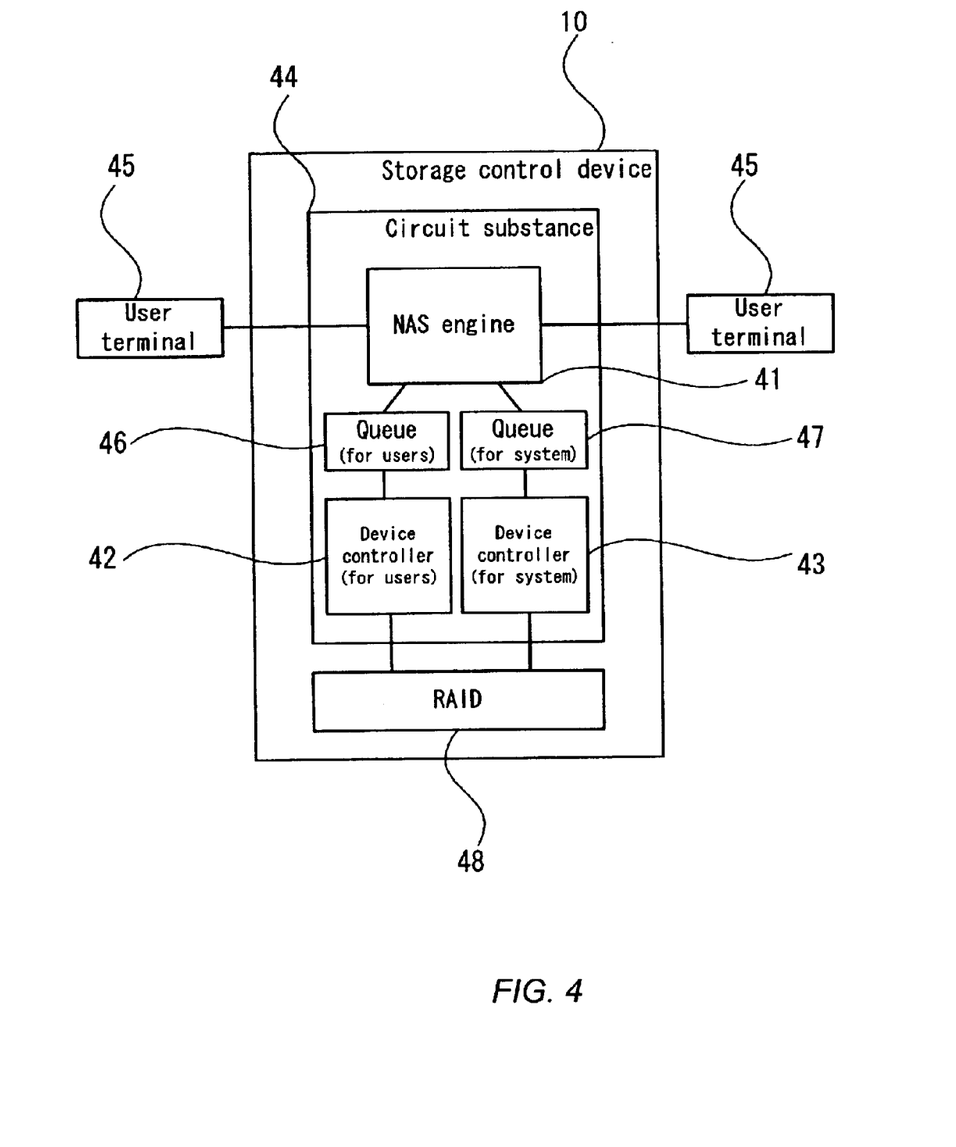
FIG. 4 is a diagram showing an overall configuration of a storage control device implemented by a still further embodiment of the present invention.

FIG. 4 is a diagram showing an overall configuration of a storage control device 10 implemented by a fourth embodiment of the present invention.

The storage control device 10 comprises a NAS engine 41 and two device controllers, namely, a user device controller 42 and a system device controller 43. The NAS engine 41 as well as the user device controller 42 and the system device controller 43 are provided on a single circuit substrate 44. The NAS engine 41 is a means for transmitting and receiving data. On the other hand, each of the device controllers 42, 43 is an execution means.

The NAS engine 41 is connected to an external user terminal 45 or a client by typically a LAN. The device controllers 42, 43 are connected to HDs, which are used as logical devices forming a RAID 48, through an SCSI interface. The single circuit substrate 44 includes an area for communications between the NAS engine 41 and the device controllers 42, 43. In this area, provided are two queues, namely, a user queue 46 and a system queue 47 corresponding to the user device controller 42 and the system device controller 43, respectively. A command sent by the external user terminal 45 is associated with a queue tag for identifying a source sending the command. For example, a queue tag <0> is added to commands that have been sent from the user terminal 45 and a queue tag <1> is added to system-related commands that have been sent from the NAS engine 41 itself.

In the storage control device 10 having the configuration described above, a failure recovery means is provided with the NAS engine 41. When one of the device controller 42, 43 has failure, it is capable of resetting the failed one 42, 43 by sending a signal to it. In addition, the failed device controller 42, 43 and the queue 46, 47 that is associated with the failed one 42, 43, are disconnected from the remaining circuits on the circuit substrate 44 so that commands can be executed by using the normally operating device controller 42, 43 and the queue 46, 47 which is associated with the normal one.

In the case of the storage control device 10 implemented by this embodiment, in the event of a failure occurring in one of the device controllers, for example the user device controller 42, a detection means employed in the NAS engine 41 will not receive a response signal from the user device controller 42 within a predetermined period of time in response to a communication signal sent by the NAS engine 41. If the NAS engine 41 does not receive such a response signal from the user device controller 42, a failure is judged to exist in the controller 42.

Assume, for example, that a command with a queue tag of <0> indicating the user queue 46 and a certain LUN is transmitted from the user terminal 45 to the storage control device 10. In this case, the NAS engine 41 puts the command in the user queue 46 according to the queue tag of <0>. Then, the user device controller 42 receives the command from the user queue 46 and executes the command against an HD indicated by the LUN associated with the command.

In the storage control device 10 having the configuration described above, when the NAS engine 41 detects failure occurring in the user device controller 42, the NAS engine 41 supplies a failure recovery signal to the user device controller 42, making an attempt to reset the user device controller 42.

If the attempt to reset the user device controller 42 ends in a failure, the user device controller 42 is disconnected from the system. To put it concretely, if a command with a queue tag of <0> corresponding to the user queue 46 and a certain LUN is sent from the user terminal 45 to the storage control device 10, the NAS engine 41 stores the command in the system queue 47 even though the command is accompanied by a queue tag of 0. In this case, the system device controller 43 receives the command from the system queue 47 and executes the command against an HD indicated by the LUN included in the command.

Fifth Embodiment

In this embodiment, as a detection means for detecting a failure, a heart beat technique is adopted. To put it in detail, in the storage control device 10 having the configuration shown in FIG. 4, the NAS engine 41 and the device controllers 42, 43 send a signal to each other at a predetermined interval. In this case, if a signal is not received from the other side in a predetermined period of time, it is judged that the other side has some failure. A concrete subsequent flow of commands and a subsequent recovery from the failure are the same as the fourth embodiment and are thus not explained again.

Sixth Embodiment

A storage control device 10 implemented by this embodiment has the same configuration as that shown in FIG. 4. In this case, however, the user device controller 42 and the system device controller 43 send a signal to each other at a predetermined interval. If one side does not receive a signal from the other side, it is judged the device controller that has not sent a signal has got some failure. A concrete subsequent flow of commands and a subsequent recovery from the failure are the same as the fourth embodiment and are thus not explained again.

Other Embodiments

In the first to third embodiments, the device controller is connected to HDs in accordance with the SCSI specifications. However, they do not have to be connected to the HDs in accordance with the SCSI specifications. That is to say, they can be connected to the HDs through an interface in accordance with other specifications or an original specification.

In the fourth to sixth embodiments, the storage control device 10 includes a plurality of queues, namely, the user queue 46 and the system queue 47, and a plurality of device controllers, namely, the user device controller 42 and the system device controller 43. It is noted, however, that the queue or the device controller may be provided singularly.

While the method to recover from a failure comprises two steps, that is, a step of resetting a device controller, which has a failure, and a step of disconnecting the device controller from the system, either one of the steps may be omitted.

In all the embodiments, as a logical device employed in the storage control device 10, an HD is assumed. It is to be noted, however, that recording media other than the HD can also be employed. Such recording media include an FD (Floppy Disk), an MO, a CD-R/RW, a DVD, a CF (Compact Flash), an SM (Smart Media) and others.

The NAS engine 31 and the device controller 32 can also be built on separate substrates instead of building them on a single circuit substrate 33.

In the method of processing a command in the embodiments, a group ID and a LUN are obtained from the user terminal and recognized by the storage control device 10. As an alternative, the storage control device 10 may determine and/or add a group ID and a LUN to a command received from the user terminal.

In the first to fifth embodiments, the NAS engine is employed as a means for receiving and sending data. It is to be noted, however, that an NFS protocol may also be adopted as a network protocol between the NAS engine and the user terminal.

The preferred embodiments of the present invention have been explained in detail. It is obvious, however, that changes, replacements and modifications can be made to the embodiments without departing from the present invention's spirit and range, which are defined in the claims appended.

What is claimed is:

1. A storage control device connected to an external apparatus for exchanging data therebetween, said storage control device comprising:
    a plurality of logical devices, each of which is associated with one of a plurality of identifiers, the number of which does not exceed a predetermined number, the plurality of logical devices including a group of logical devices for system use;
    an input/output module configured to receive a data input/output request with one of said identifiers from said external apparatus and to input/output data to/from the logical device that corresponds to the identifier; and
    an execution module;
    wherein said storage control device is configured to form a plurality of identifier groups, each of which includes said predetermined number or less of said identifiers and is given one of a plurality of first IDs, each said first ID identifying a group of logical devices different from the group of logical devices for system use;
    wherein said input/output module is configured to receive a data input/output request with one of said identifiers as well as one of said first IDs from said external apparatus; and
    wherein said execution module is configured to input/output data to/from the logical device that corresponds to the identifier and is included in the identifier group that corresponds to the first ID.

2. The storage control device of claim 1, wherein a data communication between said logical devices and execution module including a command is carried out by passing data based on a CDB (Command Descriptor Block) prescribed in SCSI specifications.

3. The storage control device of claim 1, further comprising a plurality of queues, each of which is associated with one of said first IDs,
    wherein the data input/output request with one of said first IDs as well as one of said identifiers is received from said external apparatus and stored in the queue that corresponds to the first ID; and
    wherein said execution module is configured to implement said data input/output request on the basis of priority assigned to each of said queues.

4. The storage control device of claim 1, further comprising a plurality of queues, each of which is associated with one of said first IDs,
    wherein the data input/output request with one of said first IDs is received from said external apparatus and stored in the queue that corresponds to the first ID; and
    wherein said execution module is configured to implement said data input/output request on the basis of priority assigned to each of said queues.

5. The storage control device of claim 4, wherein said input/output module has a sending/receiving module configured to send/receive data to/from said external apparatus in form of a file;
  wherein said execution module is configured to input/output data to/from at least one of said logical devices; and
  wherein said sending/receiving module is configured to direct said execution module to implement an a data input/output request to/from said logical device, which has been received from said external apparatus.

6. The storage control device of claim 5, wherein said sending/receiving module is configured to categorize said input/output request and store said input/output request in one of said queues; and
  wherein said execution module is configured to assign priority to each of said queues and inputs/outputs data according to said priority.

7. The storage control device of claim 5, wherein a circuit implementing said sending/receiving module and a circuit implementing said execution module are provided on the same substrate.

8. The storage control device of claim 1, wherein said execution module and said input/output module are configured to monitor each other for one module to detect failure that has occurred in the other module.

9. The storage control device of claims 8, wherein said execution module and said input/output module monitor each other by sending a signal periodically and, if one module does not receive the signal from the other module for a predetermined period of time, it is judged that the other module has failure.

10. The storage control device of claim 8, wherein one of said execution module and said input/output module sends a failure-repairing signal for repairing a failure to the other module in judging that the other module has failure.

11. The storage control device of claim 1, comprising a plurality of execution modules configured to input/output data to/from at least one of said logical devices,
  wherein said input/output module is configured to select a specific execution module among said execution modules and direct said selected execution module to input/output data to/from said logical device.

12. The storage control device of claim 11, wherein said selected execution module and said input/output module monitor each other for one module to detect a failure that has occurred in the other module.

13. The storage control device of claim 12, wherein, if one of said execution modules has a failure and said input/output module receives an input/output request specifying the failed execution module, said input/output module is configured to direct another execution module to implement said input/output request.

14. The storage control device of claim 11, wherein the plurality of said execution modules monitor each other for one of said execution modules to detect failure that has occurred other of said execution modules.

15. The storage control device of claim 11, wherein the plurality of said execution modules monitor each other by sending a signal periodically and, if one of said execution modules does not receive the signal from another of said execution modules for a predetermined period of time, it is judged that said another module has a failure.

16. The storage control device of claim 11, wherein one of execution modules sends a failure-repairing signal for repairing a failure to another of said execution modules in judging that said another module has a failure.

17. A storage control device connected to a user terminal for exchanging data therebetween, said storage control device comprising:
  a plurality of logical devices, each of which is associated with one of a plurality of identifiers, the number of which does not exceed a predetermined number, the plurality of logical devices including a group of logical devices for system use;
  an input/output module configured to receive a data input/output request with one of said identifiers from said user terminal and to input/output data to/from the logical device that corresponds to the identifier; and
  an execution module;
  wherein said storage control device is configured to form a plurality of identifier groups, each of which includes said predetermined number or less of said identifiers, said identifier groups that includes an identifier group identifying a system area and an identifier group identifying a user area being each given one of a plurality of first IDs, each said first ID identifying a group of logical devices different from the group of logical devices for system use;
  wherein said input/output module is configured to receive a data input/output request with one of said identifiers as well as one of said first IDs given to the identifier group identifying the user area from said user terminal; and
  wherein said execution module is configured to input/output data to/from the logical device that corresponds to the identifier and is included in the identifier group that corresponds to the first ID.

* * * * *